United States Patent [19]

Pernice

[11] Patent Number: 5,179,872
[45] Date of Patent: Jan. 19, 1993

[54] MAGNETO ROTOR

[75] Inventor: Robert J. Pernice, 708 S. Palomino La., Anaheim, Calif. 92807

[73] Assignees: Robert J. Pernice; Sophia C. Pernice, both of Anaheim, Calif. ; a part interest

[21] Appl. No.: 775,278

[22] Filed: Oct. 11, 1991

[51] Int. Cl.⁵ .................... G05G 1/00; H02K 21/22
[52] U.S. Cl. .................... 74/572; 74/573 R; 310/153
[58] Field of Search .................... 74/572, 573 R, 574; 310/153, 67 R, 42, 152, 154, 156

[56] References Cited

U.S. PATENT DOCUMENTS

| | | | |
|---|---|---|---|
| 2,568,479 | 9/1951 | Armstrong et al. | 310/153 |
| 2,963,599 | 12/1960 | Gayler | 310/153 |
| 3,034,005 | 5/1962 | Carr | 310/153 |
| 3,368,275 | 2/1968 | Eberline et al. | 310/153 |
| 3,828,212 | 8/1974 | Harkness et al. | 310/153 |
| 4,012,651 | 3/1977 | Burson | 310/153 |
| 4,345,553 | 8/1982 | Magrane et al. | 310/153 X |
| 4,423,345 | 12/1983 | Nilsson | 310/153 |
| 4,433,473 | 2/1984 | Benedetti | 310/153 X |
| 4,795,924 | 1/1989 | Kamiyama et al. | 310/153 X |
| 4,918,830 | 4/1990 | Aso | 310/154 X |
| 4,973,871 | 11/1990 | Bisantz | 310/42 X |
| 5,070,268 | 12/1991 | Phelon | 310/153 X |
| 5,092,195 | 3/1992 | Parsons | 74/572 |

FOREIGN PATENT DOCUMENTS 1139375 6/1987 France .................... 74/572

Primary Examiner—Vinh T. Luong
Attorney, Agent, or Firm—Klein & Szekeres

[57] ABSTRACT

A magneto rotor includes a bowl-like aluminum body with an open end defined by an annular rim having an inner peripheral surface. A plurality of arcuate pockets are machined into the peripheral rim surface, each of the pockets extending between first and second radiused ends, the radius of curvature of the pockets being approximately equal to the radius of curvature of the rim. A light weight, high field-strength magnet, formed as an arcuate plate of a neodymium-iron alloy, is adhesively fixed in each of the pockets. Each of the magnets substantially conforms to the pocket in which it is seated, and extends between first and second radiused ends. The engagement between the radiused pocket ends and the radiused magnet ends restrains the magnets from dropping radially inwardly from the pockets should the adhesive fail. The magnets are restrained from moving axially out of the pockets by a retaining ring that covers the open tops of the pockets. In a preferred embodiment, the magnet alloy is approximately 33 percent neodymium, 64 percent iron, 1 percent boron, and 2 percent dysprosium. The resulting rotor structure provides high magnetic field strength with relatively low structural mass, thereby enhancing engine performance.

21 Claims, 2 Drawing Sheets

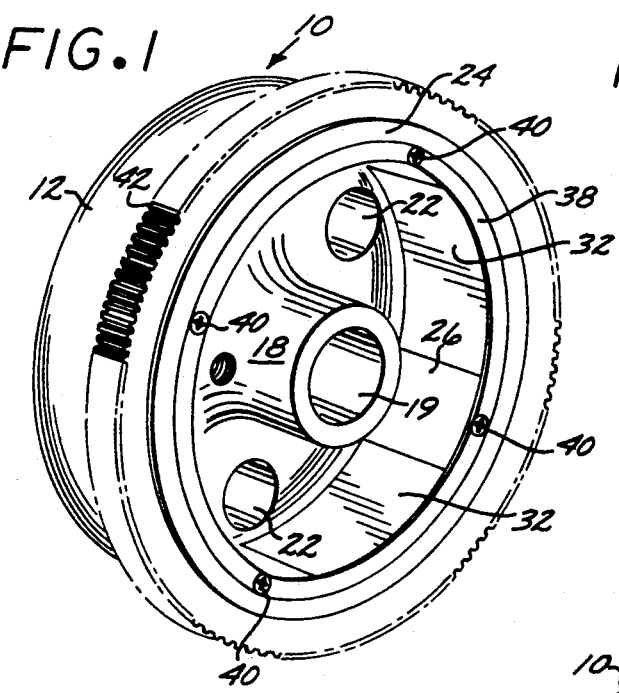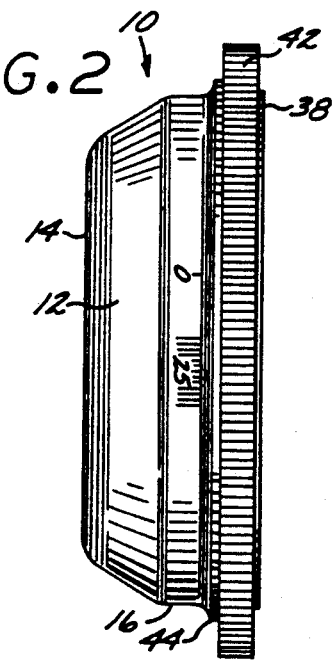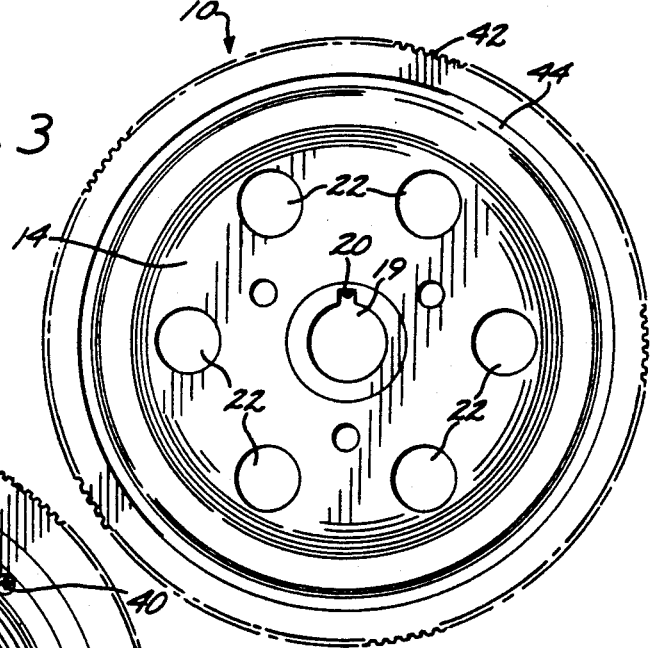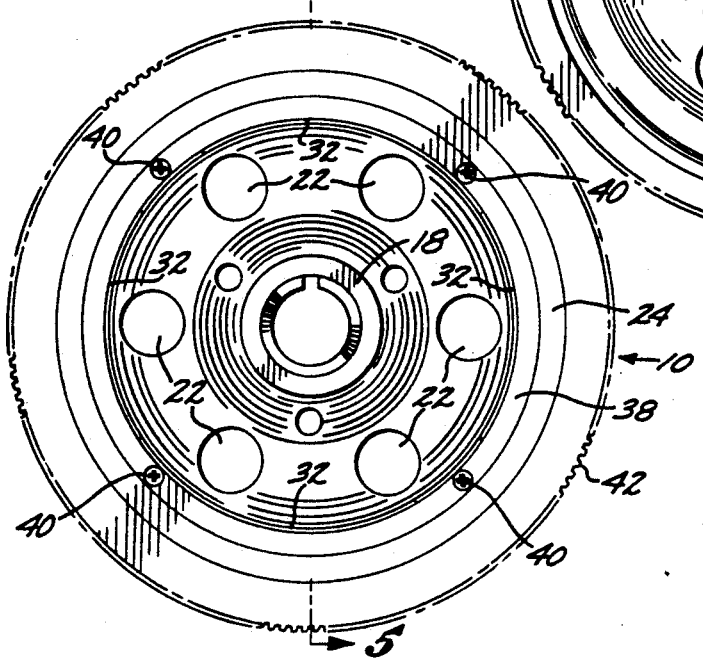

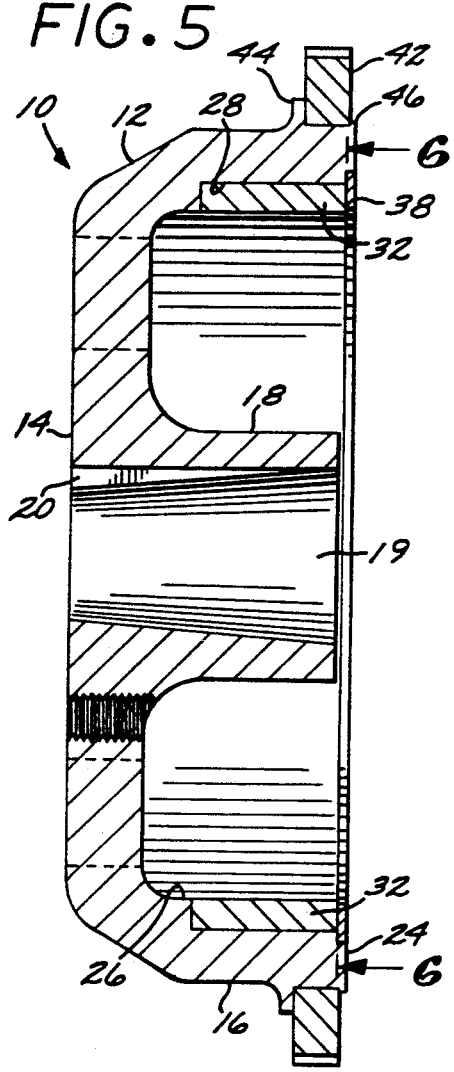
FIG. 5
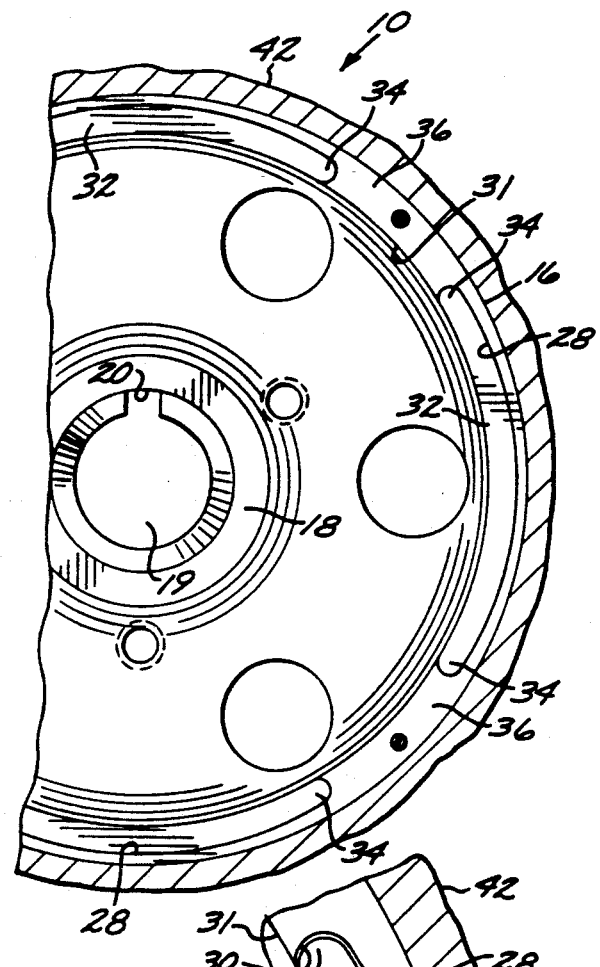
FIG. 6
FIG. 7
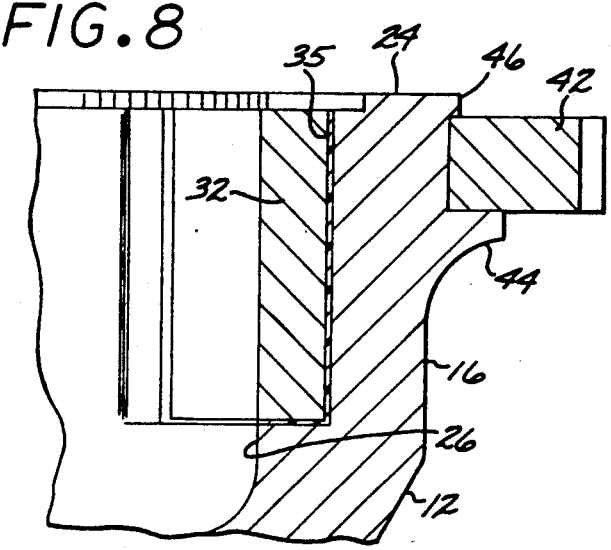
FIG. 8

MAGNETO ROTOR

BACKGROUND OF THE INVENTION

This invention relates generally to the field of flywheels or rotors used in internal combustion engines having magneto ignition systems. More specifically, the invention relates to a improvements in such magneto rotors that provide substantial weight reductions, thereby yielding enhanced engine performance.

Conventional magneto rotors, used in small internal combustion engines (of the type found in vehicles such as jet skis), comprise a substantially annular body having a closed end and an open end. A sleeve for the engine crank shaft extends axially through the center of the rotor from the closed end to the open end. The annular peripheral wall of the rotor is coaxial with the central sleeve, defining an annular inner peripheral surface, facing the sleeve, to which a plurality of magnets are attached. The magnets typically are fabricated of magnetized steel or ceramic. The magnets are typically attached to the inner peripheral surface of the rotor by rivets or an adhesive, or both.

The steel or ceramic magnets used in the prior art rotors are relatively massive, necessitating a rotor that is, likewise, relatively massive. Thus, such rotors are typically fabricated of a steel alloy to achieve the needed levels of structural strength and rigidity.

As can be appreciated from the above description, the typical prior art rotors, with large, heavy magnets and a relatively massive support structure, add considerable mass to the engine crank shaft to which the rotor is attached. The result is a relatively large moment of inertia that must be overcome upon starting the engine. Furthermore, the relatively large rotor mass results in inertial losses that impair acceleration.

There has thus been a long-felt need for a magneto rotor of substantially reduced mass that does not sacrifice either structural strength or magnetic field strength.

SUMMARY OF THE INVENTION

Broadly, the present invention is a light-weight magneto rotor having low-mass, high field-strength magnets disposed in pockets machined in the rotor rim, and retained in the pockets by an adhesive and by the physical structure or geometry of the pockets.

More specifically, the invention is a rotor, of a light-weight, high-strength metal such as aluminum, in which neodymium-iron alloy magnets are seated in a plurality of pockets disposed at spaced intervals around the inner peripheral surface of the rim. The pockets substantially conform to the external configuration of the magnets, and each pocket extends, between radiused ends, along a fraction of the circumference of the rim. The radiused pocket ends conform to the radiused ends of the magnets, and they are configured so as to prevent the magnets from dropping radially inwardly out of the pockets should the adhesive bond fail. A retaining ring covers the open tops of the pockets to prevent axial movement of the magnets out of the pockets.

The neodymium alloy magnets used in the rotor are characterized by their relatively low mass and high field strength. This low mass-to-field strength ratio for the magnets allows the use of a rotor that, itself, is substantially lower in mass than the typical rotor, since less structural strength is needed to carry the relatively light weight magnets than would be needed to carry the relatively massive steel or ceramic magnets used in prior art rotors. Moreover, the low mass-to-field strength ratio of the magnets allows them to be formed as relatively thin, curved slabs, that can be received in relatively shallow pockets in the rotor rim. Because the pockets can be made shallow, the rim thickness can be reduced, as compared with prior art rotors, thereby further contributing to lower rotor mass without sacrificing structural strength.

As a result of the reduced mass of the rotor constructed in accordance with the instant invention, as compared with prior art rotors, there is less mass attached to the engine crank shaft, and thus a lower moment of inertia that must be overcome upon starting the engine or upon accelerating. Thus, there is less power wasted in overcoming this inertia, resulting in quicker acceleration and higher top speed for a vehicle using the instant invention, compared to one using a conventional rotor.

BRIEF DESCRIPTION OF THE DRAWINGS

FIG. 1 is a perspective view of a magneto rotor constructed in accordance with a preferred embodiment of the present invention;

FIG. 2 is a side elevational view of the rotor;

FIG. 3 is an elevational view taken from the left side of FIG. 2, showing the exterior of the rotor;

FIG. 4 is an elevational view taken from the right side of FIG. 2, showing the interior of the rotor;

FIG. 5 is a cross-sectional view taken along line 5—5 of FIG. 4;

FIG. 6 is a fragmentary cross-sectional view taken along line 6—6 of FIG. 5;

FIG. 7 is an enlarged, detailed view of one of the magnet pockets, with its magnet contained therein, shown in FIG. 6; and FIG. 8 is a fragmentary cross-sectional view taken along line 8—8 of FIG. 7.

DETAILED DESCRIPTION OF THE PREFERRED EMBODIMENT

Referring now to the drawings, a magneto rotor 10, in accordance with a preferred embodiment of the present invention, is shown. The rotor 10 has a generally bowl-shaped body 12, that is preferably formed of a strong, light-weight metal, such as aluminum, that can be easily machined. The rotor body 12 has a closed end 14 and an open end defined by an annular rim 16 that is concentric with a tubular shaft coupling member 18 extending axially from the center of the body 12 toward the rim 16. The interior surface of the shaft coupling member 18 defines a bore 19 with an axially-extending slot 20 that serves as a key way for a keyed crank shaft (not shown) that fits into the bore 19 when the rotor is attached to the shaft. A plurality of holes 22 are preferably provided in the closed end 14 of the body to reduce its mass.

The rim 16 has an annular facing 24 that is perpendicular to an annular inner peripheral surface 26, into which are machined a plurality of evenly-spaced, arcuate slots or pockets 28. Each of the pockets 28 has an open side 29 facing radially inwardly toward the center of the rotor. Each of the pockets extends between a pair of radiused ends 30, with a radius of curvature that is substantially equal to the radius of curvature of the annular surface 26, and an arc-length that is a fraction of the circumference of the annular surface 26. In the preferred embodiment shown, there are four such pockets 28, of equal arc-length, and separated by portions of the inner-peripheral surface 26 that form "lands" 31 between the pockets.

As best shown in FIGS. 6 and 7, each of the pockets 28 receives a magnet 32. The magnets 32 are formed as relatively thin, curved plates, configured and dimensioned substantially to conform to the pockets 28, with substantially the same radius of curvature and arc length. The concave surface of each magnet is exposed from the open side of its pocket. Like the pockets 28, each of the magnets 32 has a pair of opposed radiused ends 34.

The magnets 32 are made of a light-weight material that is capable of being magnetized to a high field strength, and that has a relatively high working temperature (at least about 80 degrees C; preferably, about 120 degrees C). Certain neodymium-iron alloys meet these criteria. For example, the preferred material is an alloy comprising approximately 33 per cent neodymium, 64 per cent iron, 1 per cent boron, and 2 per cent dysprosium. This alloy has a working temperature of about 120 degrees C, which is substantially higher than the typical temperatures in the engine compartment of a jet ski or like vehicle in which the rotor would be used. Magnets made of this alloy exhibit approximately three times the field strength of the conventional ceramic magnets used in prior art rotors, and yet they are much lighter in weight.

The magnets are adhesively bonded into the pockets 28 by a suitable epoxy adhesive 35. A specific example that has been successfully used in a preferred embodiment of the present invention is an elastomer modified methacrylate resin that cures upon contact with an activator having a base of 1,1,1-trichloroethane. Products of this type that are commercially available include those marketed by Loctite Corporation, Newington, Conn., under the trademarks "DEPEND 330" No-Mix Adhesive, and "DEPEND 738" Activator. Other epoxy-type adhesives may also provide a sufficiently strong bond between the aluminum of the rotor body and the Nd-Fe-B alloy of the magnets.

The radiused pocket ends 30 extend just enough onto the radially inward side of the magnets to keep the magnets from dropping out of the pockets, in a radially-inward direction, should the adhesive bond fail. The relatively small mass of the magnets, coupled with the strong adhesive bond that can be obtained between their alloy and the aluminum of the rotor by means of the aforementioned epoxy adhesive, makes riveting of the magnets unnecessary.

Each of the above-mentioned "lands" of the annular surface 26 terminates in an end surface 36. The end surfaces 36 form seats for a retaining ring 38, concentric with, and radially inward from the rim facing 24. The retaining ring 38 retains the magnets 32 in the pockets 30, keeping the magnets from moving axially out of the pockets. The retaining ring 38 is fixed to the end surfaces 36 by means of screws 40 or the like. The end surfaces 36 are axially recessed with respect to the facing surface 24 of the rim 16, so that the retaining ring 38 lies flush with the rim facing 24.

As with conventional magneto rotors, the rotor body 12 accommodates a ring gear 42 that fits around the exterior of the rotor rim 16, and that is seated against a peripheral shoulder 44. An improvement incorporated in the preferred embodiment of the present invention is a short peripheral lip 46, substantially coplanar with the end face 24, that helps retain the ring gear 42 against the shoulder 44. Because the outside diameter of the rotor at the lip 46 is greater than the inside diameter of the ring gear 42, the rotor body has to be thermally contracted, such as by cooling it in a liquid nitrogen bath, before the ring gear 42 can be installed.

The present invention, as described above, offers several advantages over conventional, prior art rotors, largely resulting from the use of the low mass, high field strength Nd-Fe-B magnets. Specifically, the relatively low mass of the magnets (and their thin cross-sections) allow the use of a rotor body made of a relatively lightweight metal, such as aluminum, rather than steel. Furthermore, the low mass of the magnets, coupled with the engagement between the radiused ends of the magnets and the radiused ends of the pockets, allows the magnets to be installed with an adhesive only, obviating the need for rivets. Thus, there are substantial weight savings stemming from the use of light-weight magnets, a light-weight rotor body, and the absence of rivets. Typically, about a 30 per cent weight reduction can be achieved. By way of specific example, a rotor constructed in accordance with the present invention and weighing approximately 3.75 pounds replaced a conventional rotor weighing approximately 5.25 pounds. Similarly, a conventional rotor weighing approximately 3.25 pounds was replaced by one weighing approximately 2.25 pounds and constructed in accordance with the present invention.

The above-described weight reduction for the rotor translates into a substantial reduction in the moment of inertia for the crank shaft to which the rotor is attached. This, in turn, reduces wasted engine power, and yields quicker acceleration and higher top speeds for the vehicles equipped with the present invention, as compared to those using conventional rotors. For example, when a conventional rotor in a "jet ski" engine was replaced with a rotor constructed in accordance with the present invention, the top speed of the jet ski increased approximately 2 mph (i.e., from about 36 mph to about 38 mph, or about 5.5 per cent), and its acceleration was noticeably quicker.

Although a preferred embodiment of the invention has been described above and illustrated in the drawings, it will be appreciated that a number of variations and modifications may suggest themselves to those skilled in the pertinent arts. For example, the materials for the rotor, magnets, and adhesive described above are exemplary only, for purposes of disclosing the best mode of the invention, and suitable substitutes may be found for these materials. Furthermore, the specific configuration of the magnets and their associated pockets may be altered, for example, by shaping the magnet ends and pocket ends as acute angles to keep the magnets from dropping radially out of the pockets. Other configurations may be found that will accomplish this same result. These and other modifications and variations should be considered within the spirit and scope of the claims that follow.

What is claimed is:

1. A magneto rotor, comprising:
   a substantially bowl-shaped body with an open end defined by an annular rim having an inner peripheral surface;
   a plurality of arcuate pockets in the rim, each of the pockets extending between first and seconds ends and having a radius of curvature substantially equal to the radius of curvature of the peripheral surface, each pocket having an open radially-inward side; and a magnet formed as an arcuate plate of a neodymium-iron alloy disposed in each of the pockets, each magnet extending between first and second ends and substantially conforming to the shape of the pocket in which it is disposed, the magnets being retained in the pockets at least in part by the engagement between the pocket ends and the magnet ends, wherein the alloy comprises approximately 33 per cent neodymium, 64 per cent iron, 1 per cent boron, and 2 per cent dysprosium, and wherein the alloy, when magnetized, has a working temperature of approximately 120 degrees C.

2. The magneto rotor of claim 1, wherein the pocket ends and the magnet ends are radiused, and wherein the radiused pocket ends extend onto the radially inward side of the magnets.

3. The magneto rotor of claim 1, wherein the magnets are retained in the pockets at least in part by an adhesive.

4. The magneto rotor of claim 1, wherein the rotor body is made substantially of aluminum.

5. The magneto rotor of claim 4, wherein the magnets are retained in the pockets at least in part by an adhesive, and wherein the adhesive includes an elastomer modified methacrylate resin that cures upon contact with an activator having a base comprising 1,1,1-trichloroethane.

6. The magneto rotor of claim 1, wherein the pockets have approximately equal arc lengths and are separated by lands formed by portions of the inner peripheral surface.

7. The magneto rotor of claim 6, wherein each of the lands has an end surface, and wherein the magnets are restrained from moving axially out of the pockets by a retaining ring that is attached to the end surfaces.

8. The magneto rotor of claim 7, wherein the rim has a facing that is substantially perpendicular to the inner peripheral surface and concentric with the end surfaces of the lands, and wherein the end surfaces of the lands are located radially inward from the facing and are axially recessed with respect to the facing, so that the retaining ring is substantially flush with the facing.

9. A magneto rotor, comprising:
a substantially bowl-shaped body with an open end defined by an annular rim having an inner peripheral surface;
a plurality of arcuate pockets in the rim, each of the pockets extending between first and second radiused ends, and having a radius of curvature substantially equal to the radius of curvature of the peripheral surface, each pocket having an open radially-inward side; and
a magnet formed as an arcuate plate adhesively fixed in each pocket, each magnet extending between first and second radiused ends and substantially conforming to the shape of the pocket in which it is fixed;
wherein the radiused pocket ends extend onto the radially inward side of the magnets.

10. The magneto rotor of claim 9, wherein the magnets are formed of a neodymium-iron alloy.

11. The magneto rotor of claim 10, wherein the alloy, when magnetized, has a working temperature of approximately 120 degrees C.

12. The magneto rotor of claim 11, wherein the alloy comprises approximately 33 per cent neodymium, 64 per cent iron, 1 per cent boron, and 2 per cent dysprosium.

13. The magneto rotor of claim 10, wherein the rotor body is formed substantially of aluminum, and Wherein the magnets are fixed in the pockets by an adhesive comprising an elastomer modified methacrylate resin that cures upon contact with an activator having a base comprising 1,1,1-trichloroethane.

14. The magneto rotor of claim 9, wherein the pockets have approximately equal arc lengths and are separated by lands formed by portions of the inner peripheral surface.

15. The magneto rotor of claim 14, wherein each of the lands has an end surface, and wherein the magnets are restrained from moving axially out of the pockets by a retaining ring that is attached to the end surfaces.

16. The magneto rotor of claim 15, wherein the rim has a facing that is substantially perpendicular to the inner peripheral surface and concentric with the end surfaces of the lands, and wherein the end surfaces of the lands are located radially inward from the facing and are axially recessed with respect to the facing, so that the retaining ring is substantially flush with the facing.

17. A magneto rotor, comprising:
a substantially bowl-shaped body with an open end defined by an annular rim having an inner peripheral surface;
a plurality of arcuate pockets in the rim, each of the pockets extending between first and second radiused ends, and having a radius of curvature substantially equal to the radius of curvature of the peripheral surface, the pockets having approximately equal arc lengths with a portion of the inner peripheral surface forming a land between adjacent pockets, each pocket having an open radially-inward side; and
a plurality of magnets, each formed as an arcuate plate of neodymium-iron alloy having a working temperature, when magnetized, of approximately 120 degrees C, one of the magnets being adhesively fixed in each pocket, each magnet extending between first and second radiused ends and substantially conforming to the shape of the pocket in which it is fixed;
wherein the radiused pocket ends extend onto the radially inward side of the magnets.

18. The magneto rotor of claim 17, wherein the alloy comprises approximately 33 per cent neodymium, 64 per cent iron, 1 per cent boron, and 2 per cent dysprosium.

19. The magneto rotor of claim 17, wherein the rotor body is formed substantially of aluminum, and wherein the magnets are fixed in the pockets by an adhesive comprising an elastomer modified methacrylate resin that cures upon contact with an activator having a base comprising 1,1,1-trichloroethane.

20. The magneto rotor of claim 17, wherein each of the lands has an end surface, and wherein the magnets are restrained from moving axially out of the pockets by a retaining ring that is attached to the end surfaces.

21. The magneto rotor of claim 20, wherein the rim has a facing that is substantially perpendicular to the inner peripheral surface and concentric with the end surfaces of the lands, and wherein the end surfaces of the lands are located radially inward from the facing and are axially recessed with respect to the facing, so that the retaining ring is substantially flush with the facing.

* * * * *